(12) United States Patent
Liu

(10) Patent No.: US 12,069,197 B2
(45) Date of Patent: Aug. 20, 2024

(54) FOLDABLE STAND

(71) Applicant: Chi Yuan Liu, New Taipei (TW)

(72) Inventor: Chi Yuan Liu, New Taipei (TW)

( * ) Notice: Subject to any disclaimer, the term of this patent is extended or adjusted under 35 U.S.C. 154(b) by 366 days.

(21) Appl. No.: 17/544,955

(22) Filed: Dec. 8, 2021

(65) Prior Publication Data
US 2023/0020938 A1    Jan. 19, 2023

Related U.S. Application Data

(60) Provisional application No. 63/222,425, filed on Jul. 16, 2021.

(51) Int. Cl.
*H04M 1/04*    (2006.01)
(52) U.S. Cl.
CPC ..................... *H04M 1/04* (2013.01)
(58) Field of Classification Search
CPC ..... H04M 1/04; H04M 1/0216; H04M 1/0247
See application file for complete search history.

(56) References Cited

U.S. PATENT DOCUMENTS

2021/0014348 A1*  1/2021  Lin ..................... G06F 1/166
2021/0310600 A1* 10/2021  Sawaqedy ............. F16M 11/38

OTHER PUBLICATIONS

Lee Jeong Yong, Support device for smartphone, Jul. 2017, whole document, fig. 22 (Year: 2017).*

* cited by examiner

*Primary Examiner* — Keith Ferguson
(74) *Attorney, Agent, or Firm* — JCIPRNET

(57) ABSTRACT

A foldable stand suited for a portable electronic device is provided. The foldable stand includes a foldable plate and an attaching member. The foldable plate has a pair of incisions and a plurality of folding portions to be folded into at least one of an unfolded state and a plurality of folded states. In the unfolded state, a strip structure is formed by part of the folding portions located between the incisions, and a ring structure is formed by others to surround the incisions and the strip structure. In at least one of the folded states, the strip structure and the ring structure are separated from each other along the incisions. The attaching member that the portable electronic device attached thereto has a part connected to the foldable plate, and other part of the attaching member is separated from the foldable plate.

19 Claims, 16 Drawing Sheets

FOLDABLE STAND

CROSS-REFERENCE TO RELATED APPLICATION

This application claims the priority benefit of U.S. provisional application Ser. No. 63/222,425 filed on Jul. 16, 2021. The entirety of the above-mentioned patent application is hereby incorporated by reference herein and made a part of this specification.

BACKGROUND

Technical Field

The disclosure relates to a stand, particularly to a foldable stand.

Description of Related Art

To make portable electronic devices such as mobile phones and tablet computers stand on a plane or a surface, most of the users may choose to install a stand behind the electronic device or to choose an electronic device having a back cover or a protective case that can support the device, so it is easier for the users to look at the screen. Besides providing the basic support, the stand also helps the user adjust the viewing angle. Meanwhile, as an additional function, most of the stands are foldable so that the electronic device is able to change between different operation modes.

However, the structure of these stands only provides auxiliary support for the electronic device. In other words, the body of the electronic device still needs to play a part in supporting itself on the plane, so that it is fully supported along with the help from the stand. As a result, the operation or the viewing angle of the electronic device is still quite limited by the height and the terrain of the plane, so that the user cannot adjust it at will.

SUMMARY

The disclosure provides a foldable stand for supporting a portable electronic device and lifting the portable electronic device on a plane or a surface in at least one folded states.

The foldable stand provided by the disclosure is suited for a portable electronic device. The foldable stand includes a foldable plate and an attaching member. The foldable plate has a pair of incisions and a plurality of folding portions, and the folding portions are folded relative to each other into an unfolded state and a plurality of folded states. In the unfolded state, a strip structure is formed by part of the folding portions located between the incisions, and a ring structure is formed by the other part of the folding portion to surround the incisions and the strip structure. In at least one of the folded states, the strip structure and the ring structure are separated from each other along the incisions. A part of the attaching member that the portable electronic device attached thereto is connected to the foldable plate, and other part of the attaching member is separated from the foldable plate.

Based on the above, the foldable stand includes a foldable plate and an attaching member, and the portable electronic device is assembled on the attaching member. The foldable plate has a pair of incisions and a plurality of folding portions to form a double-layered strip structure and a ring structure, and the attaching member includes a folding portion disposed on one side of the ring structure. Accordingly, when the ring structure and the strip structure of the folding portions are folded into at least one of the folded states, the ring structure and the strip structure are separated from each other along the incision. One side of the ring structure is located on a plane or a surface, and part of the ring structure and the strip structure are used as a support to support the other side of the ring structure, the attaching member attached thereto, and the portable electronic device above the plane or the surface. Accordingly, the portable electronic device in this state has a lifting effect relative to the plane or the surface, and the user may operate or watch the portable electronic device without being restricted by the height and terrain of the plane or the surface.

DESCRIPTION OF THE EMBODIMENTS

Figure 1:
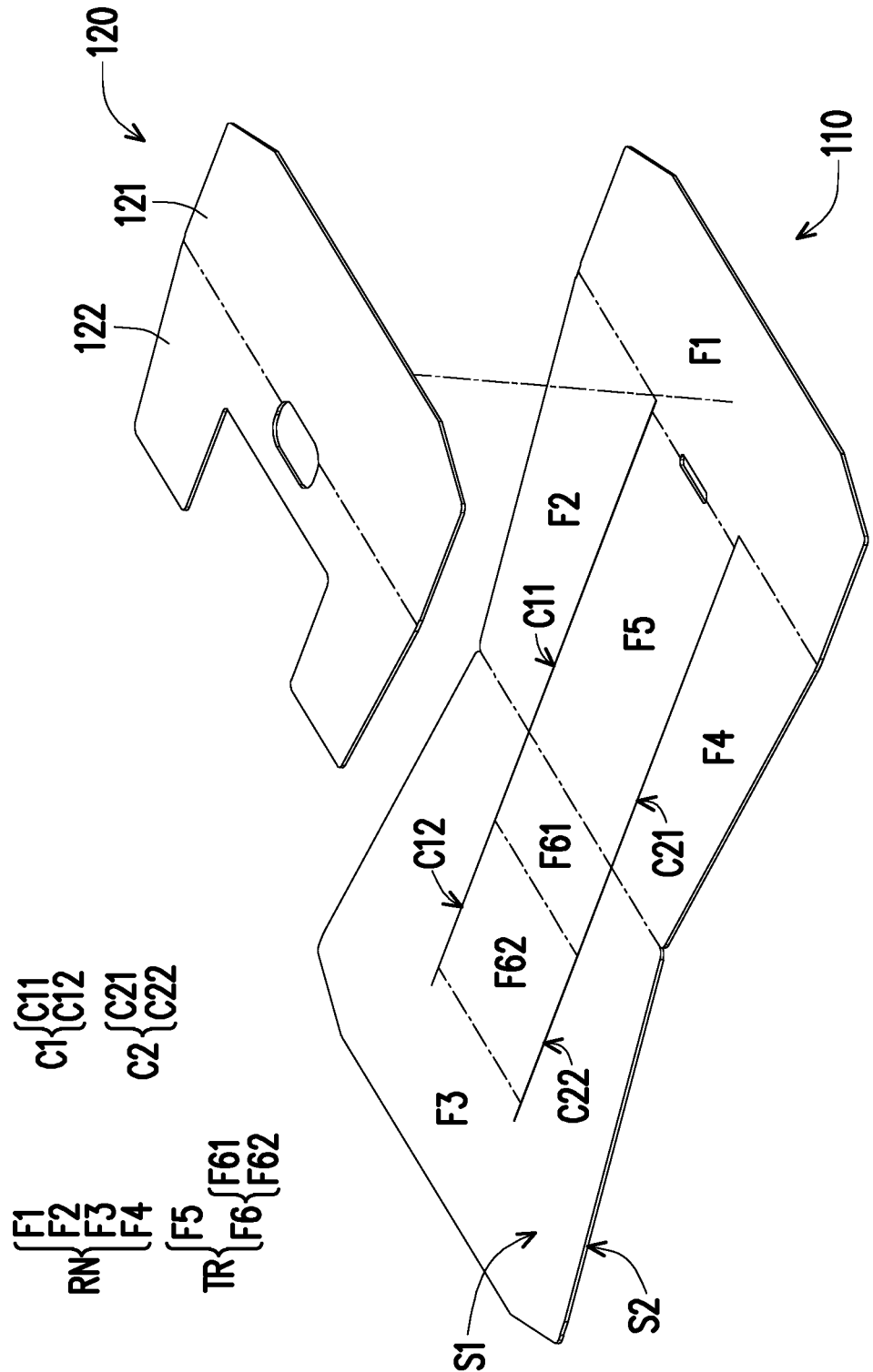
FIG. 1 is an exploded view of a foldable stand according to an embodiment of the disclosure.
Figure 2:
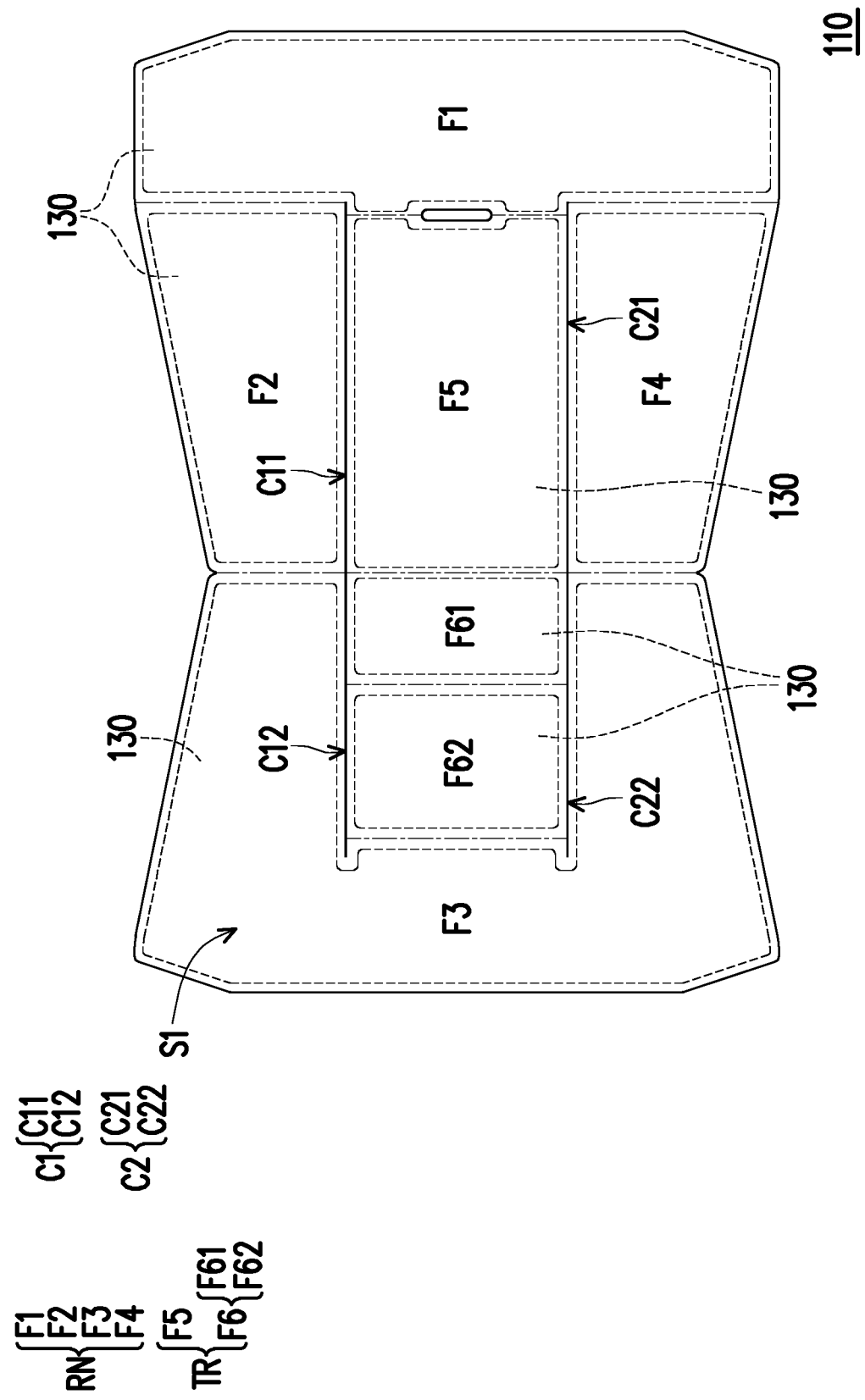
FIG. 2 shows the foldable plate in FIG. 1 from another perspective.
Figure 3:
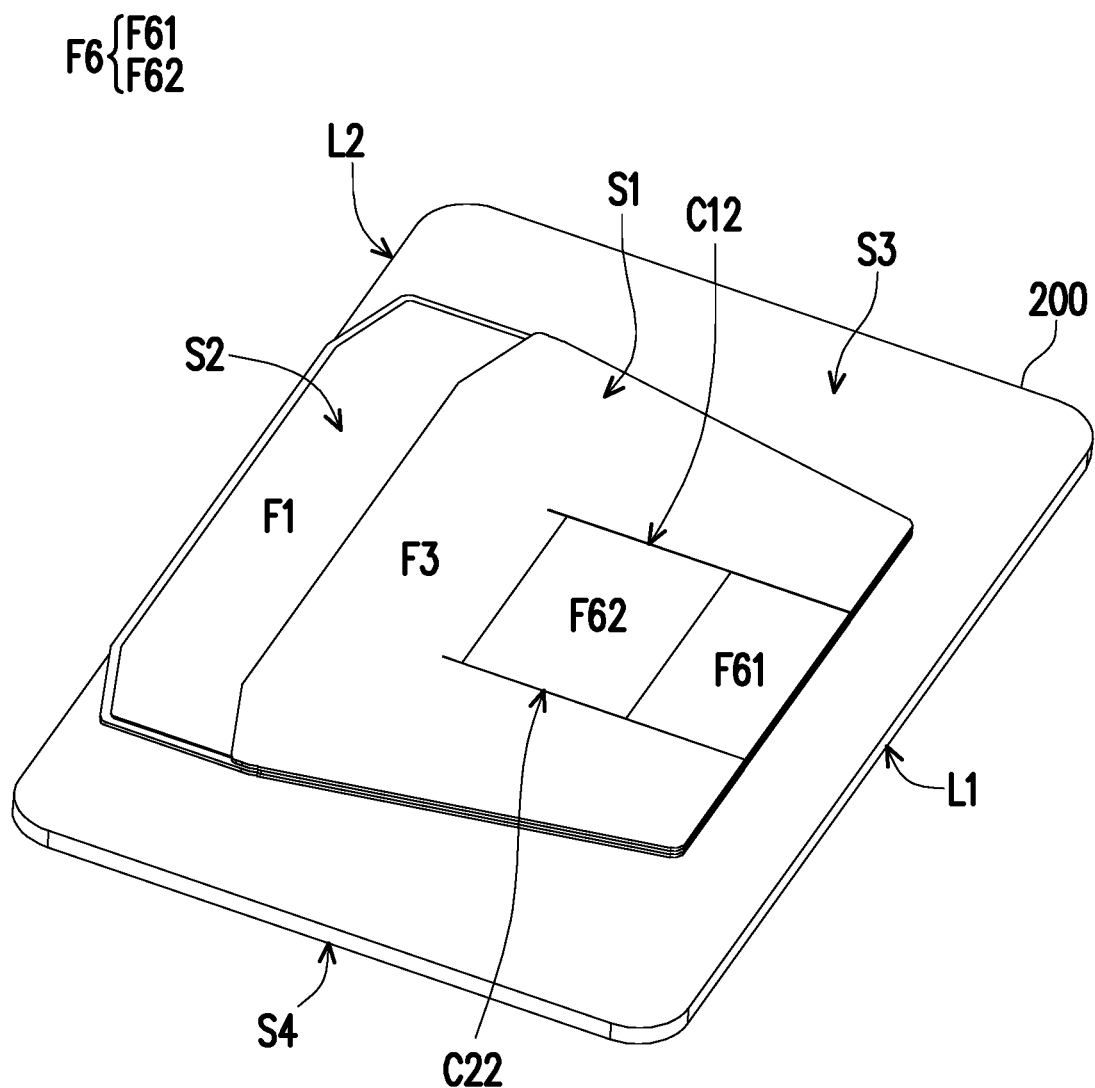
FIG. 3 is a schematic diagram of the foldable stand assembled to a portable electronic device.

FIG. 1 is an exploded view of a foldable stand according to an embodiment of the disclosure. FIG. 2 shows the foldable plate in FIG. 1 from another perspective. FIG. 3 is a schematic diagram of the foldable stand assembled to a portable electronic device. Please refer to FIG. 1 to FIG. 3 at the same time. A foldable stand 100 is suited for a portable electronic device 200 (it may be, for example, a tablet computer as shown in this embodiment) to provide protection for the portable electronic device 200 and to provide multiple operating states at the same time. The foldable stand 100 includes a foldable plate 110 and an attaching member 120. The foldable plate 110 has a pair of incisions C1 and C2 and a plurality of folding portions, and the folding portions are folded relative to each other into an unfolded state and a plurality of folded states. FIG. 1 and FIG. 2 show the foldable stand 100 in an unfolded state, and on different planes. FIG. 3 may be regarded as one of the folded states.

Please refer to FIG. 1 and FIG. 2 again. The foldable stand 100 of this embodiment further includes a plurality of magnetic members 130 respectively disposed in the folding portions to provide magnetic force of attraction during folding to allow the folding portions to attract and fix the position of one another. For the ease of recognizing the magnetic members, in this embodiment, the magnetic members 130 in FIG. 2 are represented by a dotted line, and a dash-dotted line represents the separation line between two adjacent folds. Any two adjacent folding portions are substantially rotated and folded along the separation line.

These folding portions include a folding portion F1, a folding portion F2, a folding portion F3, a folding portion F4 sequentially disposed and form a ring structure RN, a fifth folding portion F5, and at least one sixth folding portion adjacent to each other to form a strip structure TR (take the two sixth folding portions F61 and F62 as an example, that is, letting the sixth folding portion F61 and F62 form a block F6, and the sixth folding portion F61 and F62 may also be rotated and folded relative to each other). The fifth folding portion F5 is adjacent to the first folding portion F1. The sixth folding portions F61 and F62 are adjacent to the third folding portion F3 and the fifth folding portion F5.

Furthermore, the incisions C1 and C2 of this embodiment are further divided into sections C11, C12, C21, and C22. The second folding portion F2 and the fourth folding portion F4 are on opposite sides of the fifth folding portion F5 via parts of the incision C1 and the incision C2 (sections C11 and C21). The sixth folding portions F61 and F62 are separated from the other part of the third folding portion F3 by the other parts (sections C12 and C22) of the incisions C1 and C2.

As shown in FIG. 1 and FIG. 2, the foldable plate 110 has a first surface S1 and a second surface S2 opposite to each other. In the unfolded state, the fifth folding portion F5, the sixth folding portion F61, and the sixth folding portion F62 form the strip structure TR located between the incisions C1 and C2. And the ring structure RN formed by the first folding portion F1, the second folding portion F2, the third folding portion F3, and the fourth folding portion F4 are disposed in sequence surrounding the incisions C1 and C2 and the strip structure TR. The third folding portion F3 is in a U-shape, whereas the first folding portion F1, the second folding portion F2, and the fourth folding portion F4 are in another U-shape. Notches of the two U-shapes are opposite to and abut against each other.

In addition, the coupling portion 121 of the attaching member 120 is disposed at the first folding portion F1, and the extending portion 122 of the attaching member 120 extends from the coupling portion 121 and the first folding portion F1 toward the second folding portion F2 and the fourth folding portion F4. A third surface S3 of the portable electronic device 200 is assembled together with the coupling portion 121 and the extension portion 122. How the elements are assembled is not limited here, and it may be carried out by means such as attaching, buckling, and magnetic attraction. In another embodiment not shown herein, the attaching member may also be a protective case or a protective cover that can accommodate the portable electronic device 200. It is worth mentioning that the attaching member 120 is only combined with the foldable plate 110 by the coupling portion 121, and the extension portion 122 is still in a departed state with respect to the foldable plate 110.

Furthermore, as shown in FIG. 3, after the foldable stand 100 of this embodiment is assembled with the portable electronic device 200, it is substantially attached to the third surface S3 of the portable electronic device 200 in one of the folded states similar to folding in half. In other words, the second surface S2 of the foldable plate 110 is folded in half and only part of the first folding portion F1 is exposed, part of the first surface S1 of the foldable plate 110 is attached to the third surface S3 of the portable electronic device 200, and the other part of the first surface S1 is exposed together with the part of the aforementioned second surface S2 at the first folding portion F1. Here, a fourth surface S4 of the portable electronic device 200 is the display surface of its display screen. Therefore, the foldable stand 100 may be regarded as being placed on the third surface S3 of the portable electronic device 200, and the portable electronic device 200 has a side edge L1 and a second side edge L2 opposite to each other. The coupling portion 121 of the attaching member 120 (shown in FIG. 1 and FIG. 2; it is not shown in FIG. 3 since it is covered by the first folding portion F1) is substantially aligned with the side edge L2 of the portable electronic device 200.

Figure 4:
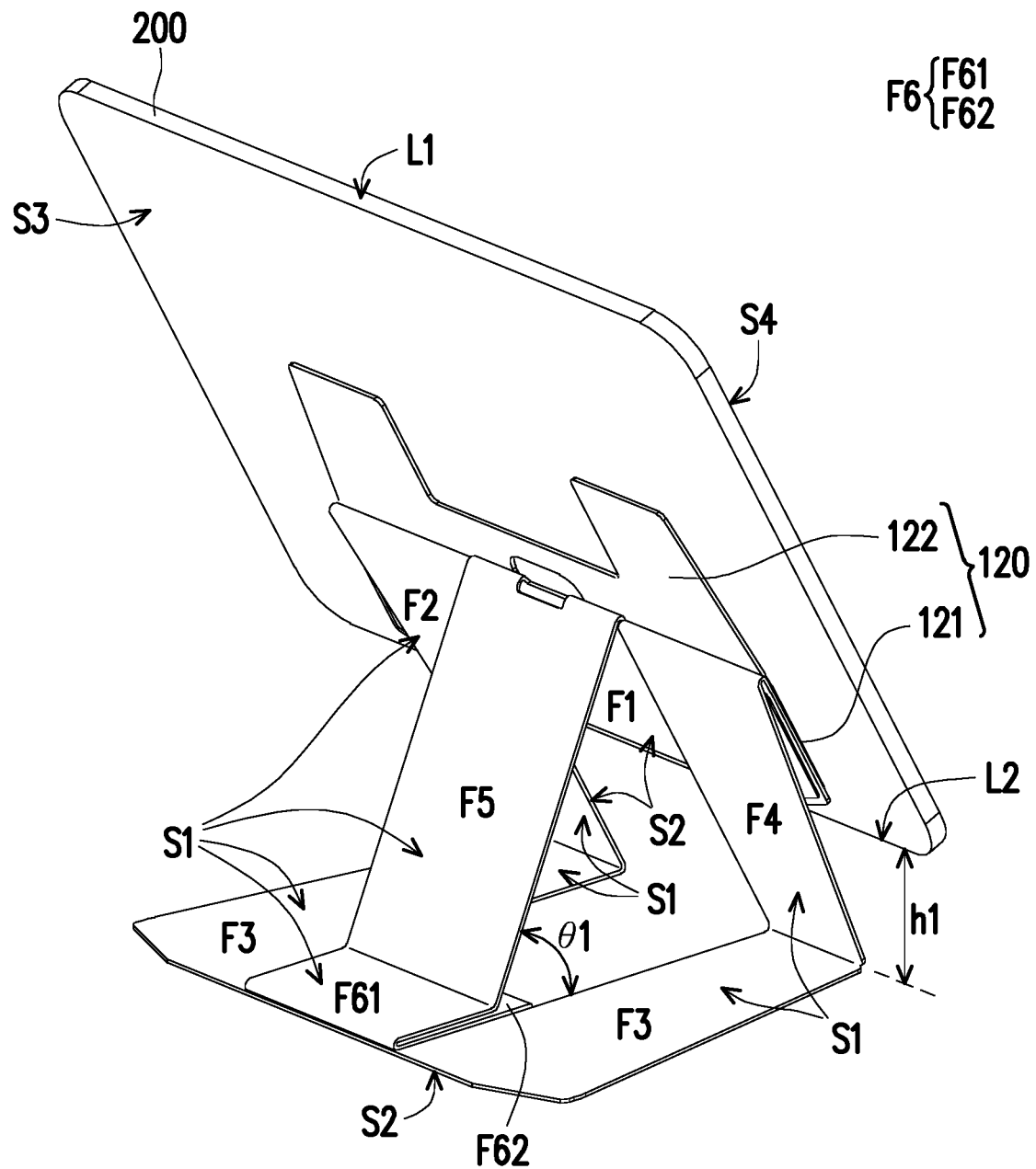
FIG. 4 to FIG. 8 show the foldable stand in different folded states.

FIG. 4 to FIG. 8 show the foldable stand in different folded states. Please refer to FIG. 4 first and compare it with FIG. 1 or FIG. 2. In the folded state as shown in FIG. 4, the strip structure TR and the ring structure RN are separated from each other along the incisions C1 and C2. The portable electronic device 200 is assembled to the attaching member 120. The coupling portion 121 of the attaching member 120 is connected to the foldable plate 110, and the extension portion 122 of the attaching member 120 is separated from the foldable plate 110.

Specifically, the first folding portion F1 is folded and stacked on the second folding portion F2 and the fourth folding portion F4, the second folding portion F2 and the fourth folding portion F4 are folded relative to the third folding portion F3, the fifth folding portion F5 is folded and departed relative to the second folding portion F2 and the fourth folding portion F4, so that the second folding portion F2, the fourth folding portion F4, and the fifth folding portion F5 stand on the third folding portion F3, and the first folding portion F1 is supported above the third folding portion F3 by the second folding portion F2, the fourth folding portion F4, and the fifth folding portion F5. Here, the folding direction of the first folding portion F1 is opposite to the folding direction of the second folding portion F2 and the fourth folding portion F4. The sixth folding portion F62 is stacked on the third folding portion F3. This is equivalent to locating one side of the ring structure RN, that is, the third folding portion F3, on a plane or a surface, and taking the strip structure TR (mainly the fifth folding portion F5) and part of the ring structure RN (the second folding portion F2 and the fourth folding portion F4) as support to support the other side of the ring structure RN (the first folding portion F1) and the attaching member 120 and the portable electronic device 200 above the plane or the surface. In other words, a height h1 of the second side edge L2 of the portable electronic device 200 exists relative to the third folding portion F3 (the plane or the surface), so that the portable electronic device 200 is lifted.

In FIG. 4, the coupling portion 121 of the attaching member 120 is superimposed on the second folding portion F2 and the fourth folding portion F4 along with the first folding portion F1. And, due to the existence of the magnetic members 130, the second folding portion F2 and the fourth folding portion F4 that are superimposed on each other may be positioned and fixed to each other, so that the portable electronic device 200 maintains the posture shown in FIG. 4. The extension portion 122 of the attaching member 120 is separated from the foldable plate 110, so that it may be smoothly departed from the second folding portion F2, the fourth folding portion F4, and the fifth folding portion F5 in the folded state in FIG. 4.

It should also be mentioned that the fifth folding portion F5 may also be held by the user, allowing the user to lift the foldable stand 100 and the portable electronic device 200. In addition to being used as another mode of operation, it is also helpful for the user to adjust the position.

Figure 5:
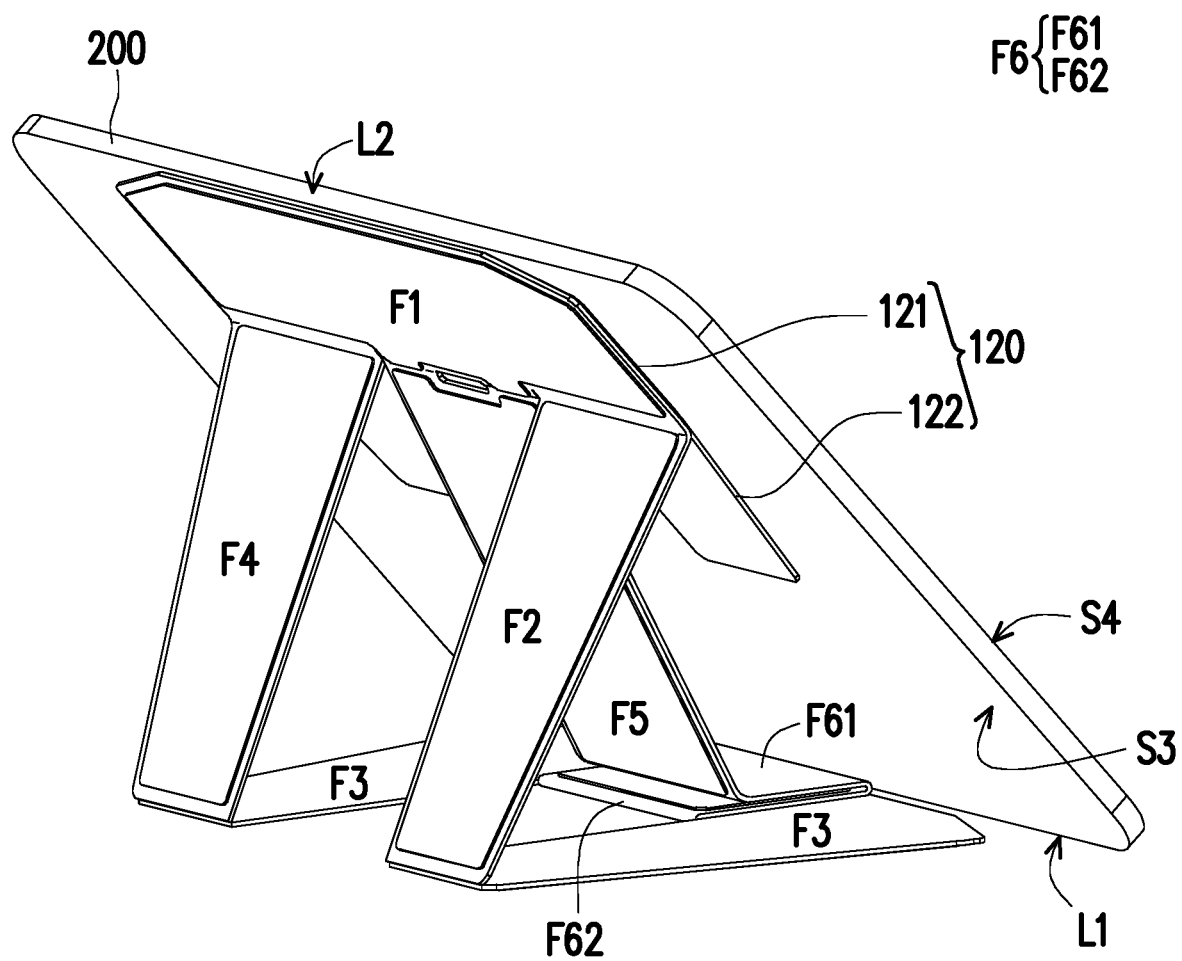

Next, please refer to FIG. 5, which shows the adjusted position of the portable electronic device 200 by folding the foldable plate 110. As shown in FIG. 5, the portable electronic device 200 is flipped over to the fifth folding portion F5 as the first folding portion F1 is moved away from the second folding portion F2 and the fourth folding portion F4. In other words, the user applies forces to cancel the magnetic attraction between the first folding portion F1, the second folding portion F2, and the fourth folding portion F4, and after it is flipped over, the side edge L1 and the third folding portion F3 are located on the same plane or surface to form another folded state. When comparing FIG. 4 and FIG. 5, it may be found that the two states as shown are similar to each other. The difference between the two is whether or not the portable electronic device 200 is lifted. It may be seen that due to the aforementioned structural features of the foldable stand 100, the portable electronic device 200 may be switched between the two different operation modes in FIG. 4 and FIG. 5 by the foldable stand 100. This also makes the portable electronic device 200 suited for interactive activity between two users facing each other.

Figure 6:
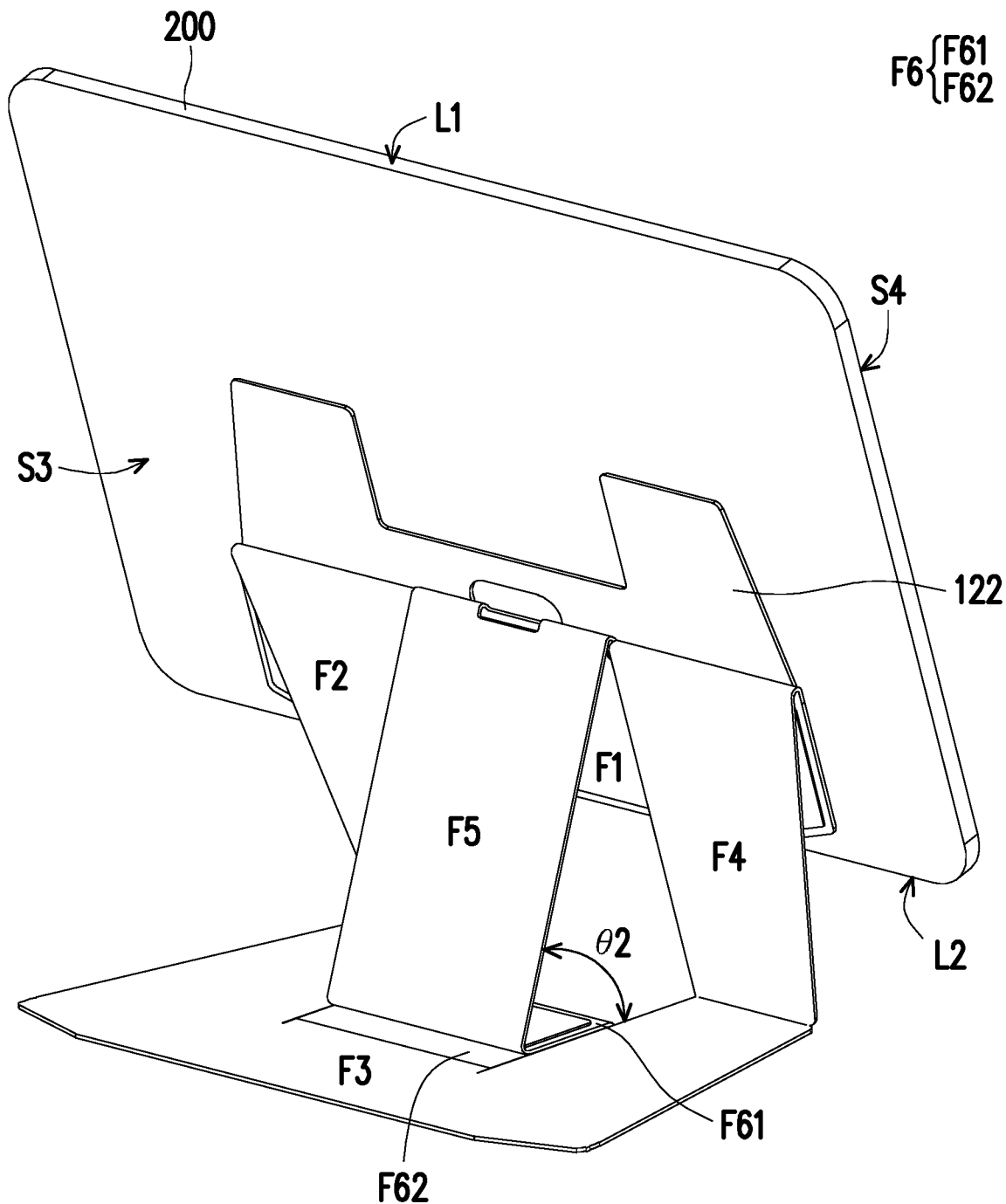
Figure 7:
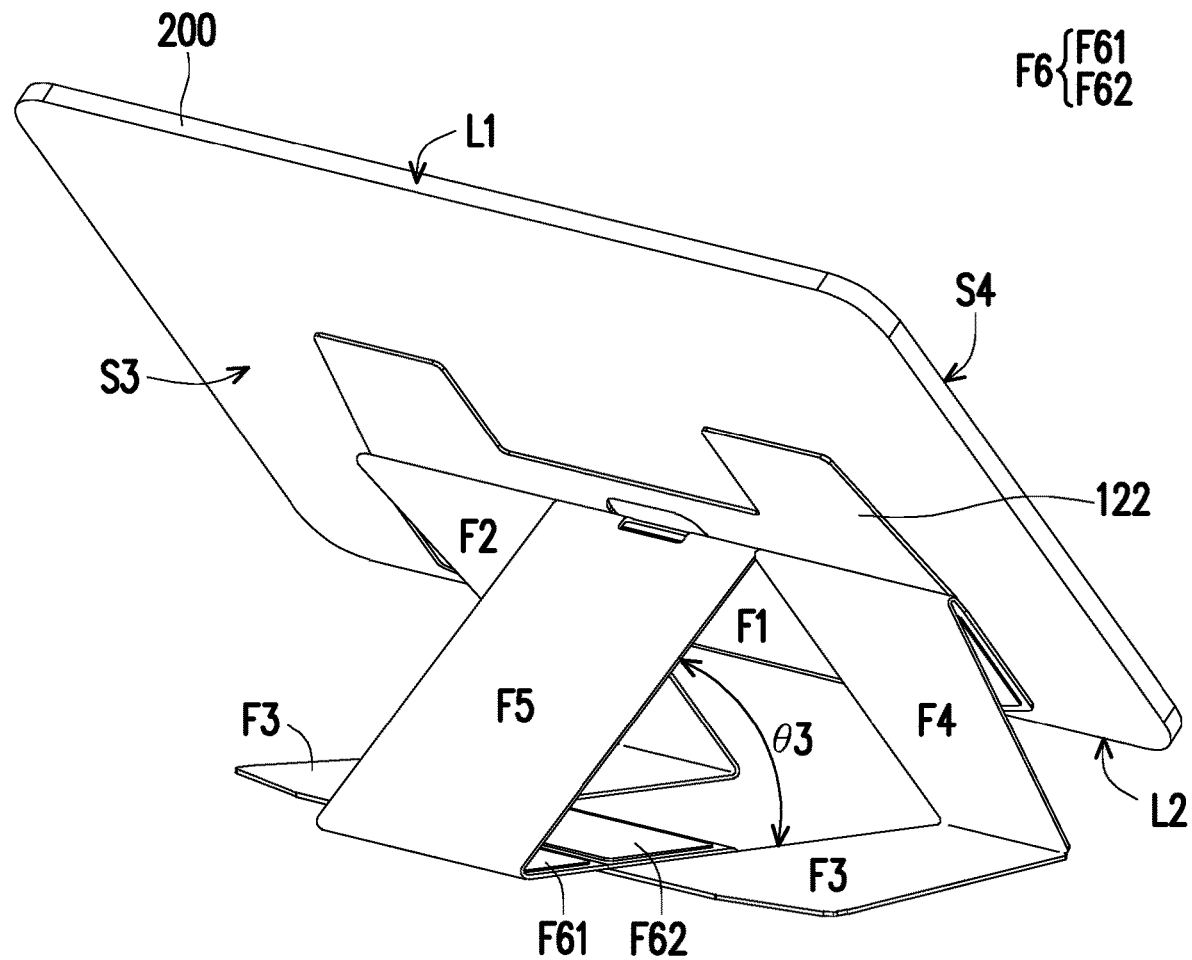

Next, please refer to FIG. 6 and FIG. 7, and compare them to FIG. 4. Different from the angle θ1 exiting between the fifth folding portion F5 and the third folding portion F3 (which is also equivalent to the plane or surface on which it is located) shown in FIG. 4, FIG. 6 and FIG. 7 respectively show two other angles (angles θ2 and θ3). The angle θ3 is smaller than the angle θ1, and the angle θ1 is smaller than the angle θ2. There are different supporting angles because the foldable and foldable block F6 formed by the two folding portions F61 and F62 in this embodiment changes between the three states as shown in the figures. As in FIG. 1 or FIG. 2, in the direction from the third folding portion F3 to the first folding portion F1, the sixth folding portion F62, the sixth folding portion F61, and the fifth folding portion F5 are adjacent to each other sequentially to form the strip structure TR. The sixth folding portion F61 shown in FIG. 4 is superimposed on the sixth folding portion F62, and the sixth folding portion F62 is superimposed on the third folding portion F3, thereby forming the angle θ1. In FIG. 6, the two sixth folding portions F61 and F62 together form a fold and are located on an inner side of the third folding portion F3 to form an angle θ2 accordingly. In FIG. 7, the sixth folding portion F62 is superimposed on the third folding portion F3, and the sixth folding portion F61 is located outside the third folding portion F3 and forms an angle θ3 accordingly.

Figure 8:
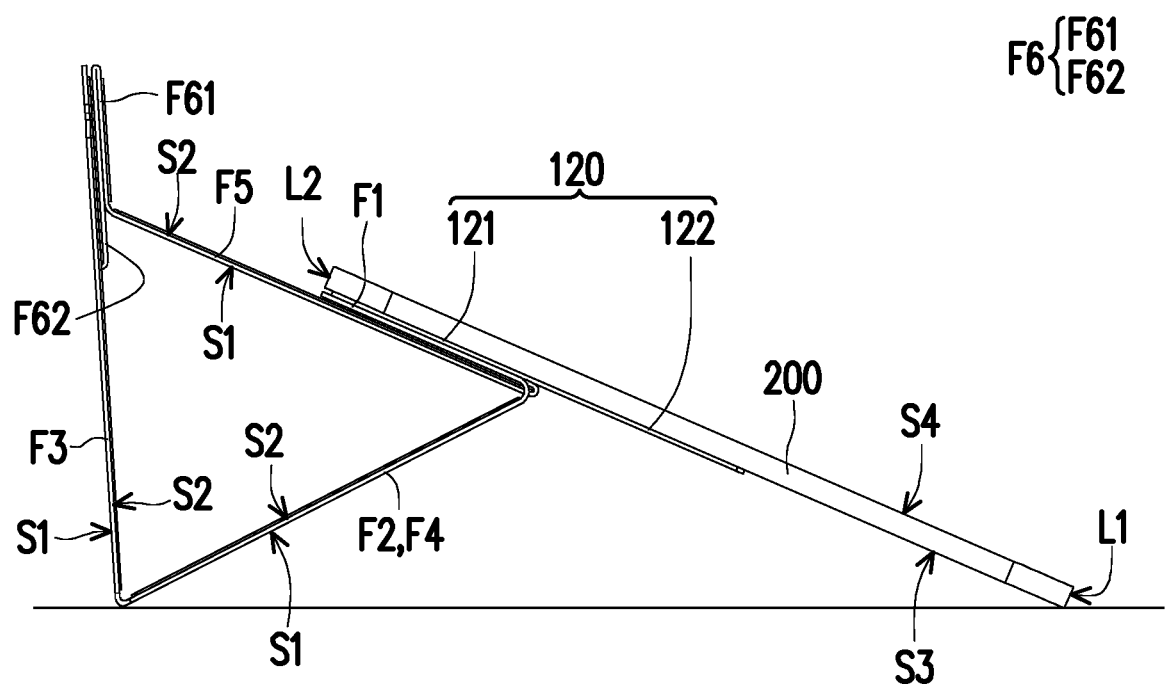

Please refer to FIG. 8, unlike the aforementioned folding technique that takes the first surface S1 of the foldable plate 110 as the reference, the foldable plate 110 of this embodiment is equivalent to taking the second surface S2 of the foldable plate 110 as the reference. Please refer to FIG. 4 at the same time. Their difference may be observed from the first surface S1 and the second surface S2 presented in the two figures.

In the folded state in FIG. 4, the second folding portion F2 is folded toward the third folding portion F3 and is opposite to the first surface S1, the fourth folding portion F4 is folded toward the third folding portion F3 and is opposite to the first surface S1, and the first folding portion F1 is stacked on the second surface S2. In contrast, in the folded state in FIG. 8, the first folding portion F1 is folded and stacked on the fifth folding portion F5, the second folding portion F2 and the fourth folding portion F4 are folded relative to the third folding portion F3, the fifth folding portion F5 is folded and separated relative to the second folding portion F2 and the fourth folding portion F4, and the sixth folding portions F61 and F62 are stacked on the third folding portion F3. In this folded state, the bends of the second folding portion F2 and the fourth folding portion F4 relative to the third folding portion F3 are coplanar with the side edge L1 of the portable electronic device 200 as they both sit on the same plane or surface, and the second side edge L2 is stacked on the fifth folding portion F5 and is spaced apart from the sixth folding portions F61 and F62. In other words, at this time, the second folding portion F2 is folded toward the third folding portion F3 and faces it with the second surface S2, the fourth folding portion F4 is folded toward the third folding portion F3 and faces it with the second surface S2, and the first folding portion F1 is stacked on the second surface S2. The folded state as shown in FIG. 8 is formed accordingly, and the portable electronic device 200 presents a drawing mode for the user at this time.

Figure 9:
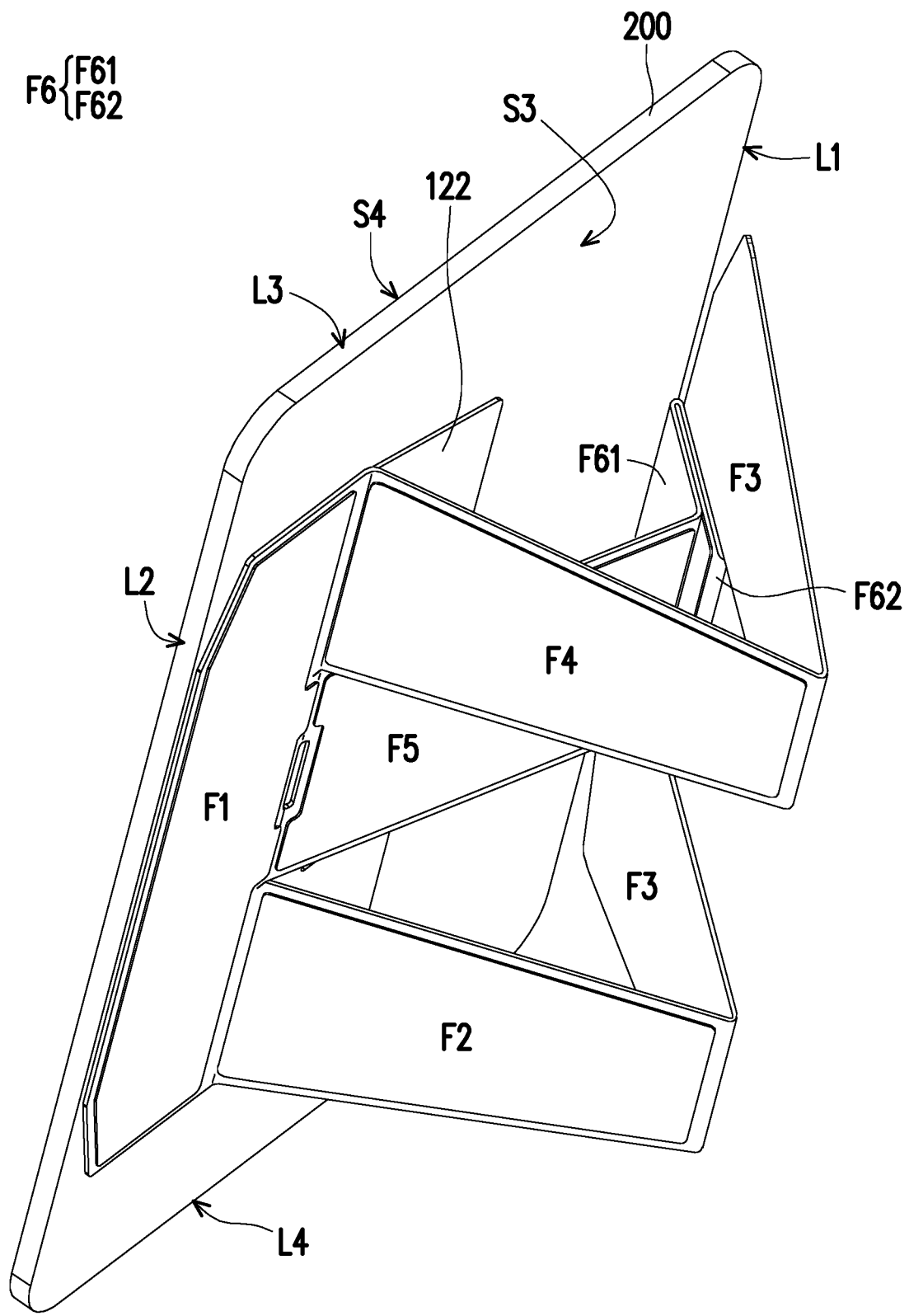
FIG. 9 is the foldable stand and the portable electronic device in a standing state.

FIG. 9 is the foldable stand and the portable electronic device in a standing state. Please refer to FIG. 9 and compare it with FIG. 5. FIG. 5 and FIG. 9 show the same folded state in different support modes. As shown in FIG. 9, the portable electronic device 200 further has a third side edges L3 and a fourth side edges L4 opposite to each other, which are respectively adjacent to the first side edge L1 and the second side edge L2. In this folded state, the third side edge L3 is adjacent to the bend of the fourth folding portion F4 and the third folding portion F3, and the fourth side edge L4 is standing on a plane or surface adjacent to the bend of the second folding portion F2 and the third folding portion F3. Similarly, the portable electronic device 200 may also stand on a flat surface or a surface supporting by the third side edge L3 and the bend of the fourth folding portion F4 and the third folding portion F3.

Figure 10:
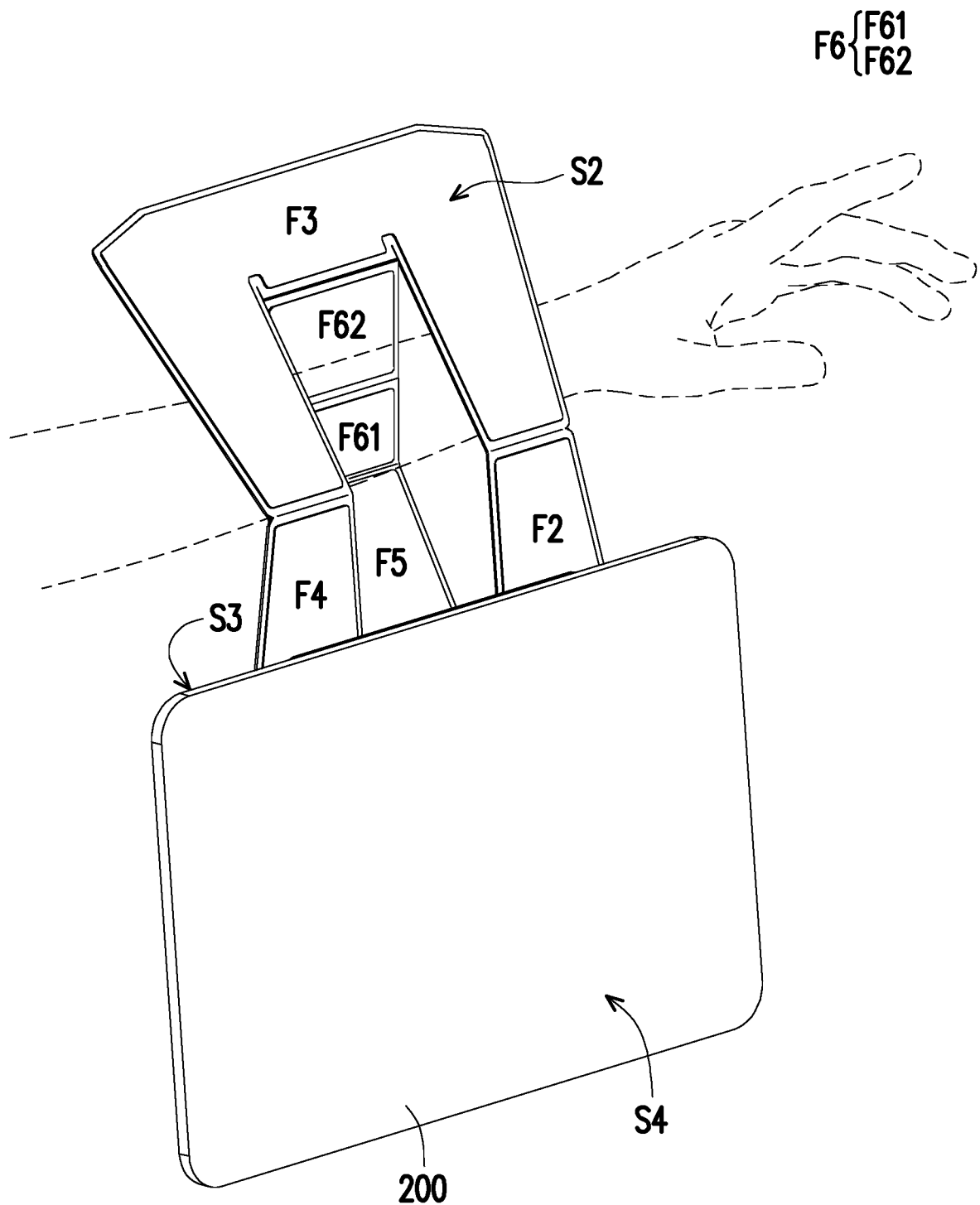
FIG. 10 shows the foldable stand in one of the used states.

FIG. 10 shows the foldable stand in one of the used states. Please refer to FIG. 10 and compare it with FIG. 1 or FIG. 2. The ring structure RN and the strip structure TR of the foldable plate 110 separated from each other along the incisions C1 and C2 may also form an opening for the user's hand to pass through so that the foldable stand 100 and the portable electronic device 200 are hung on the user's arm to facilitate the user's viewing and operation experience. In another unillustrated embodiment, the foldable stand 100 in the state shown in FIG. 10 may also present an ring structure RN and a strip structure TR that are unseparated, and the foldable stand 100 and the portable electronic device 200 may be hung on the wall that has magnetic attraction by the magnetic member 130 in the third folding portion F3.

Figure 11:
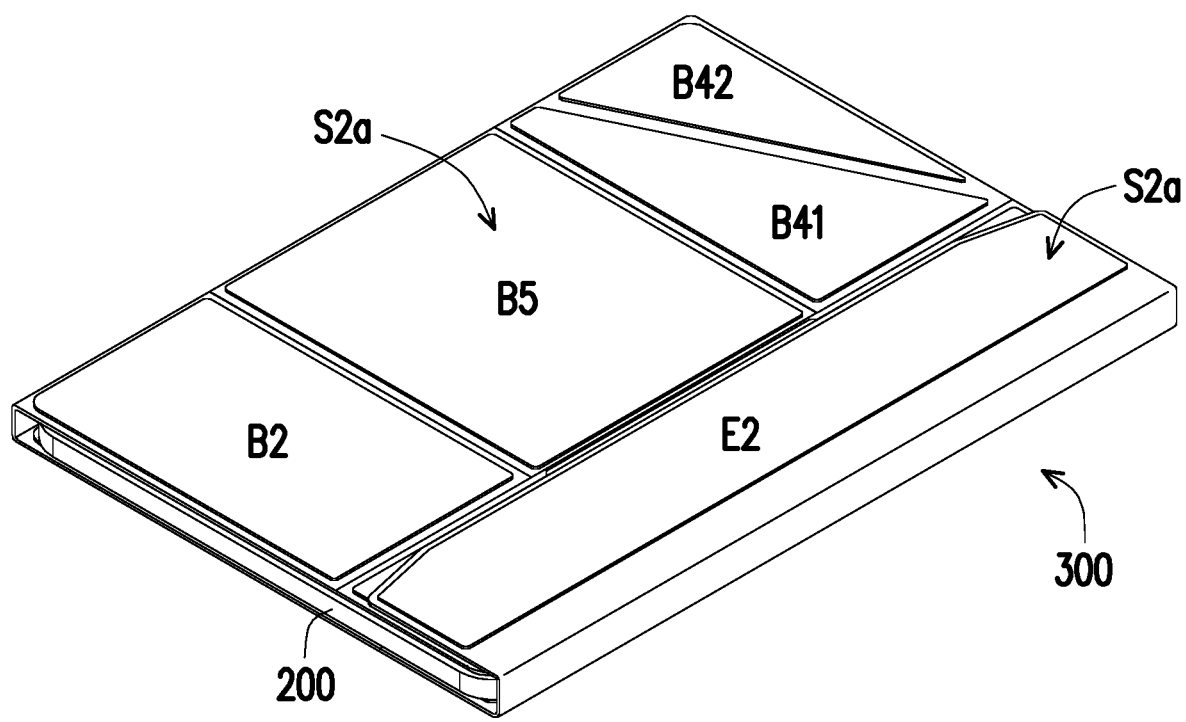
FIG. 11 is a schematic diagram of a foldable stand and a portable electronic device according to another embodiment of the disclosure.
Figure 12:
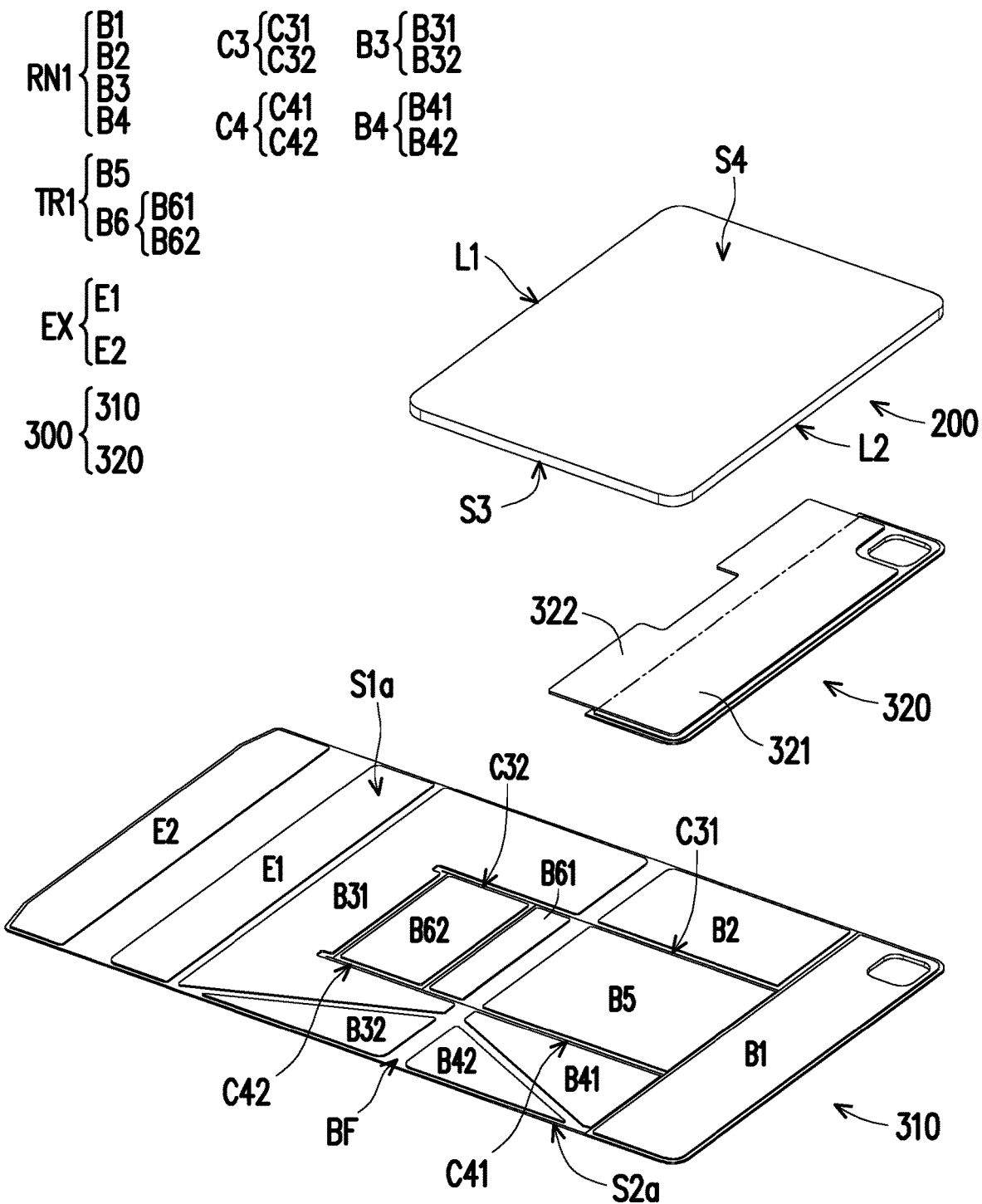
FIG. 12 is a schematic diagram of the assembled components in FIG. 11.
Figure 13:
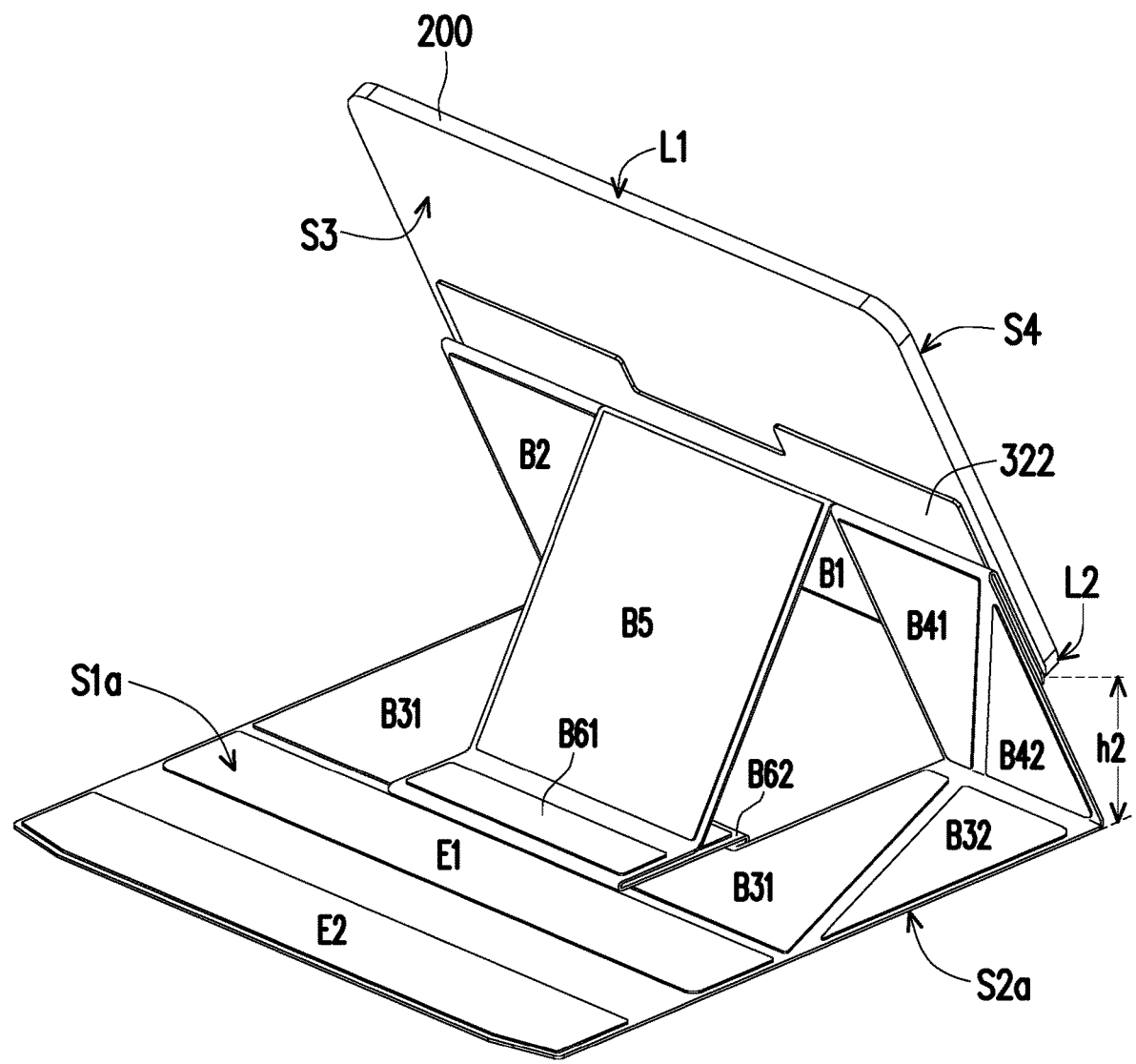
FIG. 13 shows the foldable stand in FIG. 12 in one of the folded states.

FIG. 11 is a schematic diagram of a foldable stand and a portable electronic device according to another embodiment of the disclosure. FIG. 12 is a schematic diagram of the assembled components in FIG. 11. FIG. 13 shows the foldable stand in FIG. 12 in one of the folded states. Please refer to FIG. 11 to FIG. 13 at the same time. In this embodiment, the foldable stand 300 includes a foldable plate 310 and an attaching member 320 as in the previous embodiments. The foldable plate 310 includes a plurality of folding portions and a pair of incisions C3 and C4, and the incisions C3 and C4 are also divided into different sections C31, C32, C41, and C42. The attaching member 320 includes a coupling portion 321 and an extension portion 322. The first folding portion B1, the second folding portion B2, the third folding portion B3, and the fourth folding portion B4 form a ring structure RN1. The fifth folding portion B5 and the sixth folding portions B61 and B62 form a strip structure TR1. In this embodiment, the block B6 is also formed by the two sixth folding portions B61 and B62. Therefore, the same structural features as in those of the foregoing embodiments are not be repeated here.

The difference is that the folding portions of this embodiment further include at least one seventh folding portion. Here, two seventh folding portions E1 and E2 are taken as an example in this embodiment. The seventh folding portions E1 and E2 as shown form blocks EX that are foldable relative to each other. The seven folding portions E1 and E2 are adjacent to the third folding portion B3 and are opposite to the second folding portion B2, the fourth folding portion B4, the fifth folding portion B5, and the sixth folding portions B61 and B62. Simply put, the seventh folding portion E1 is adjacent to and between the third folding portion B3 and the seventh folding portion E2. Take the third folding portion B3 as the reference, the seventh folding portions E1 and E2 are located on the opposite sides of the second folding portion B2, the fourth folding portion B4, the fifth folding portion B5, and the sixth folding portions B61 and B62. Here, the seventh folding portion E1 may be regarded as an extension structure of the foldable plate 310. By bypassing the seventh folding portions E1 and E2 over the third folding portion B3, the sixth folding portions B61 and B62, the second folding portion B2, the fifth folding portion B5, and the fourth folding portion B4, they are stacked on the first folding portion B1. In this way, the foldable plate 310 may accommodate and wrap the portable electronic device 200 up as shown in FIG. 11. As shown in FIG. 12, the foldable plate 310 further has a buffer portion BF between the second folding portion B2, the fifth folding portion B5, the fourth folding portion B4, the sixth folding portions B61 and B62, and the third folding portion B3, so that the portable electronic device 200 shown in FIG. 11 may be accommodated in the foldable plate 310 that surrounds it.

Next, FIG. 13 shows a folded state similar to the one adopted by the foldable stand 110 in FIG. 4, providing a height h2 between the second side edge L2 of the portable electronic device 200 and a plane or a surface. The transformation is also similar to the one shown in FIG. 4 to FIG. 7, so the same is not repeated here.

Figure 14:
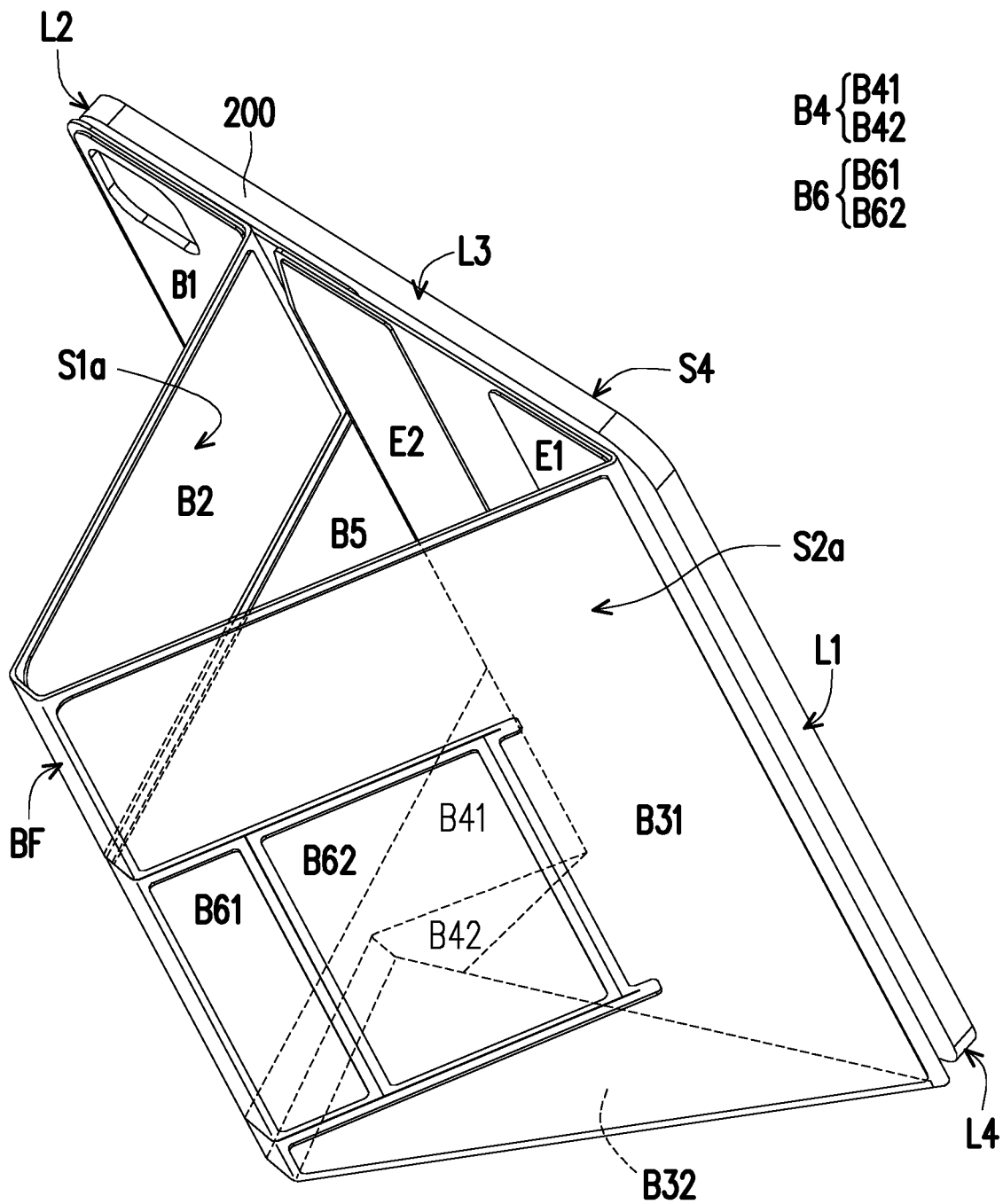
FIG. 14 shows the foldable stand and the portable electronic device in FIG. 12 in a standing state.

FIG. 14 shows the foldable stand and the portable electronic device in FIG. 12 in a standing state. Please refer to FIG. 12 and FIG. 14 at the same time. The third folding portion F3 is in a U-shape, and the U-shape includes a first sub-folding portion B31 and a second sub-folding portion B32 that are foldable relative to each other. The first sub-folding portion B31 is adjacent to the second folding portion B2, and the other side of the first sub-folding portion B31 and the second sub-folding portion B32 are adjacent to the fourth folding portion B4. Furthermore, the fourth folding portion B4 further includes a third sub-folding portion B41 and a fourth sub-folding portion B42 that are foldable relative to each other. The third sub-folding portion B41 is adjacent to the first folding portion B1 and is opposed to the first sub-folding portion B31 and the second sub-folding portion B32 with the buffer portion BF in between. The four sub-folding portions B42 are adjacent to the first sub-folding portion B31 with space in between, and are opposite to the first sub-folding portion B31 and the second sub-folding portion B32 with the buffer portion BF in between. The fourth sub-folding portion B42 and the second sub-folding portion B32 are disposed symmetrically.

As shown in FIG. 14, the second sub-folding portion B32 forms a bend relative to the first sub-folding portion B31. And the fourth sub-folding portion B42 forms another bend relative to the third sub-folding portion B41, so that the portable electronic device 200 may stand on a surface or a plane through the fourth side edge L4, the bend, and the other bend, providing a standing posture similar to that shown in FIG. 9.

Figure 15:
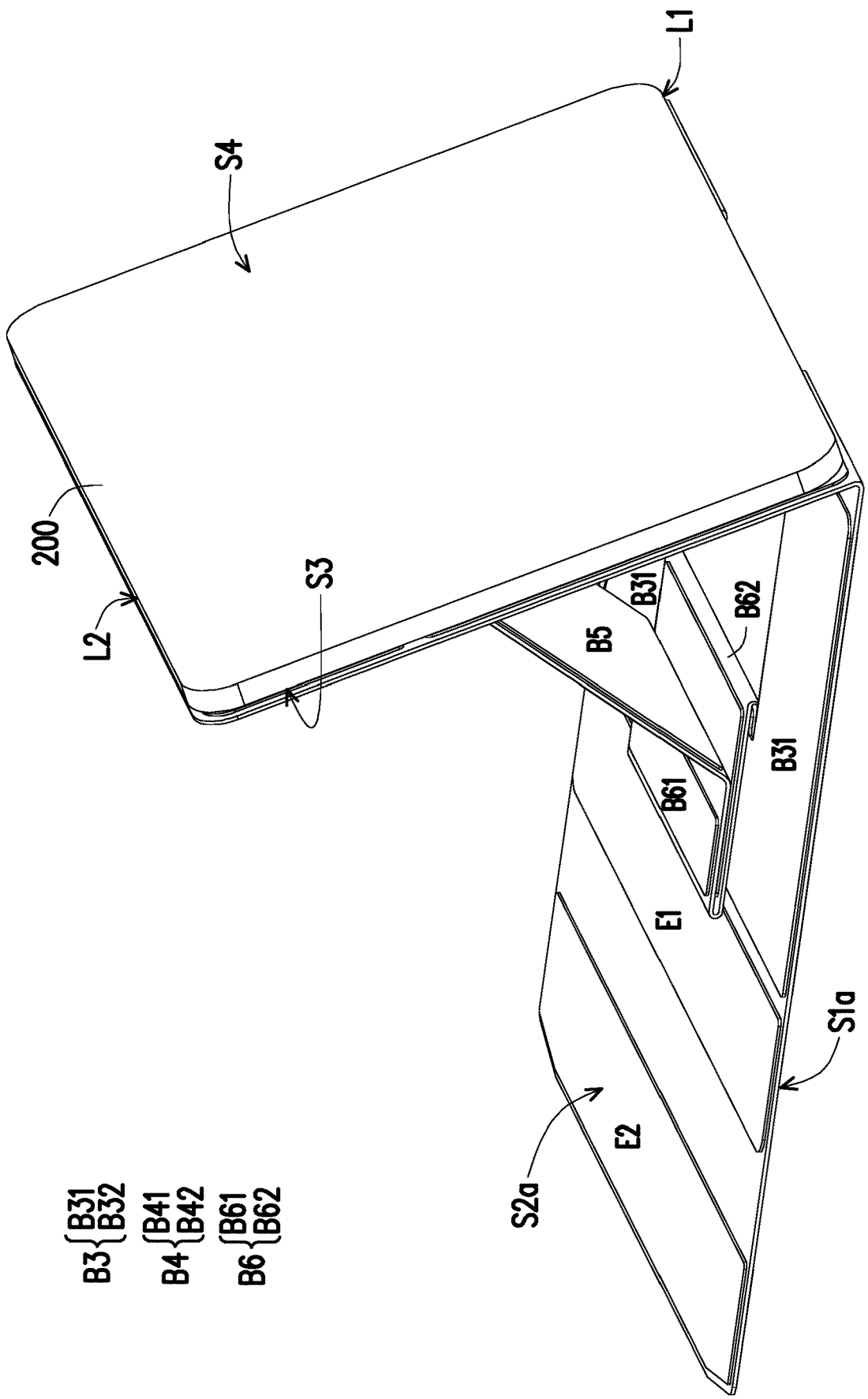
FIG. 15 shows the foldable stand in FIG. 12 folded reversely.

FIG. 15 shows the foldable stand in FIG. 12 folded reversely. Please refer to FIG. 15 and compare it to FIG. 12 or FIG. 13. The foldable plate 310 of this embodiment has two surfaces S1a and S2a opposite to each other. The portable electronic device 200 is attached to the surface S1a through the attaching member 320. The folded state shown in FIG. 13 is to make the surface S1a face inward to lift the portable electronic device 200. In contrast, the folded state in FIG. 15 shows the folding effect caused by facing the surface S2a inward. At this time, the portable electronic device 200 is not lifted, and the side edge L1, the sub-folding portion B31, and the folding portions E1 and E2 are all on the same plane (platform), making this embodiment upside-down compared to FIG. 13.

Figure 16:
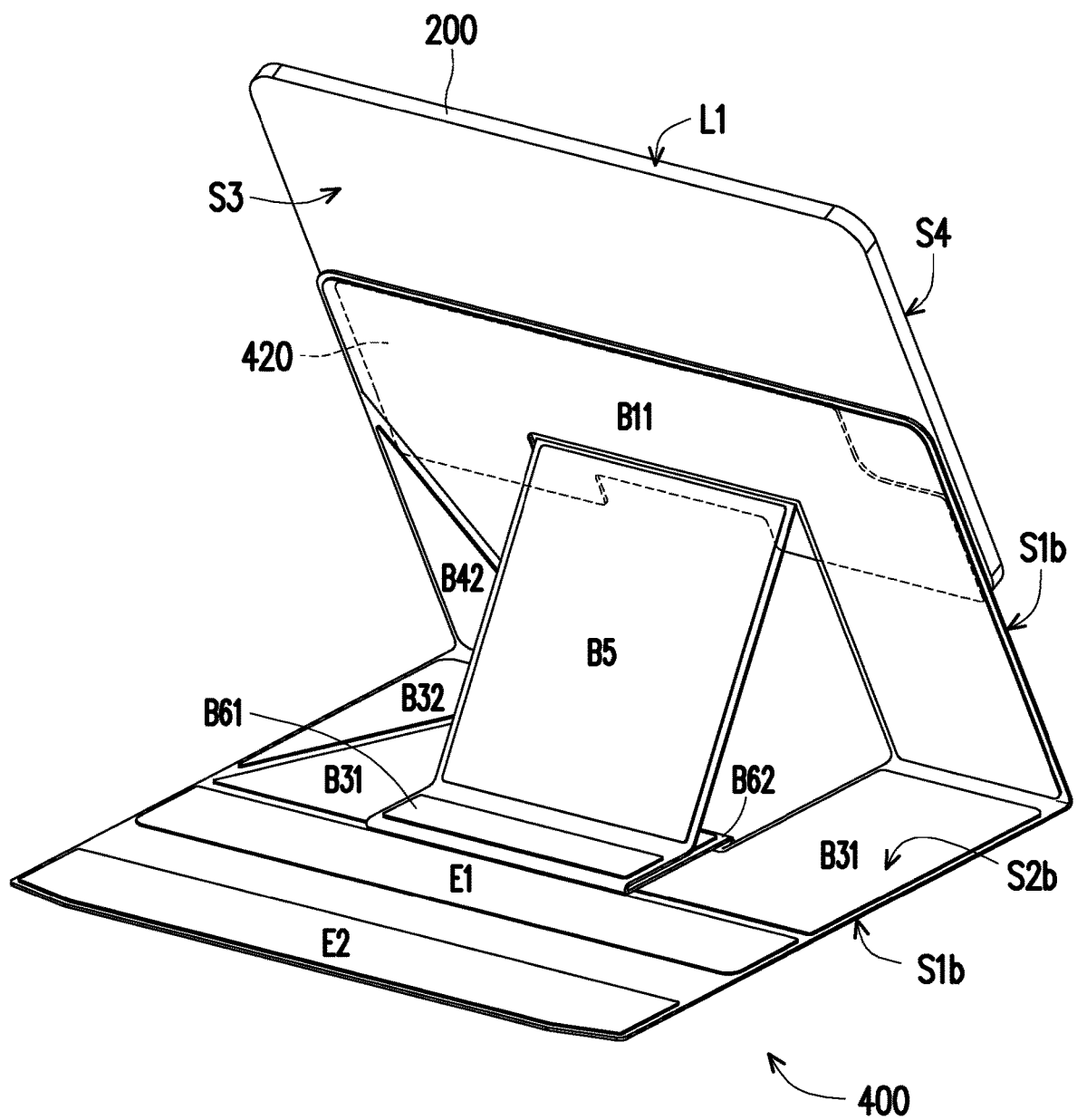
FIG. 16 is a foldable stand and a portable electronic device according to another embodiment of the disclosure.

FIG. 16 is a foldable stand and a portable electronic device according to another embodiment of the disclosure. Please refer to FIG. 16 and compare it to FIG. 13. Compared with the foregoing embodiment, the foldable stand 400 of this embodiment has two opposite surfaces S1b and S2b that are the same as the foregoing surfaces S1a and S2a. More importantly, the folding portion B11 is equivalent to an integral structure of the second folding portion B2, the first folding portion B1, and the third sub-folding portion B41 that does not rotate (or flip) as in the foregoing embodiment in FIG. 12 where the second folding portion B2, the fifth folding portion B5, and the third sub-folding portion B41 are separated from the first folding portion B1 and may be flipped relative to each other. In this embodiment, the integral folding portion B11 is equivalent to an integral structure extending to the second folding portion B2 and the third sub-folding portion B41 that avoids the flipping of the aforementioned embodiment. Furthermore, the attaching member 420 of this embodiment is a magnetic member adapted to attach to the portable electronic device 200. Therefore, the user may adjust the height of the portable electronic device 200 relative to the plane (or platform) based on their needs. In other words, the relative position that combines the portable electronic device 200 and the foldable stand 400 may be adjusted as needed.

In summary, in the embodiment of the disclosure, the foldable stand includes a foldable plate and an attaching member, and the portable electronic device is assembled on the attaching member. The foldable plate has a pair of incisions and a plurality of folding portions to form a double-layered strip structure and a ring structure. The attaching member includes a folding portion disposed on one side of the ring structure. Accordingly, when the ring structure and the strip structure of the folding portions are folded into at least one of the folded states, the ring structure and the strip structure are separated from each other along the incision. One side of the ring structure is located on a plane or a surface, and part of the ring structure and the strip structure are used as a support to support the other side of the ring structure, the attaching member attached thereto, and the portable electronic device above the plane or the surface. Accordingly, the portable electronic device in this state can have a lifting effect relative to the plane or the surface, and the user may operate or watch the portable electronic device without being restricted by the height and terrain of the plane or the surface.

What is claimed is:

1. A foldable stand suited for a portable electronic device, the foldable stand comprising:

a foldable plate, having a pair of incisions and a plurality of folding portions, wherein: the folding portions are folded relative to each other into an unfolded state and a plurality of folded states; in the unfolded state, a strip structure is formed by part of the folding portions located between the pair of incisions, and a ring structure is formed by other part of the folding portions to surround the pair of incisions and the strip structure; in at least one of the folded states, the strip structure and the ring structure are separated from each other along the pair of incisions; and an attaching member, wherein the portable electronic device is assembled to or detached from the attaching member, part of the attaching member is connected to the foldable plate, and other part of the attaching member is separated from the foldable plate, wherein the folding portions comprise a first folding portion, a second folding portion, a third folding portion, and a fourth folding portion sequentially disposed to form the ring structure, and a fifth folding portion and at least one sixth folding portion adjacent to each other to form the strip structure; the fifth folding portion is adjacent to the first folding portion; the at least one sixth folding portion is adjacent to and between the third folding portion and the fifth folding portion; the second folding portion and the fourth folding portion are on opposite sides of the fifth folding portion with part of the pair of incisions interposed therebetween; and the at least one sixth folding portion is separated by other part of the pair of incisions from other part of the third folding portion.

2. The foldable stand according to claim 1, wherein: the third folding portion is in a U-shape; the first folding portion, the second folding portion, and the fourth folding portion are in another U-shape; and notches of the two U-shapes are opposite to and abut against each other.

3. The foldable stand according to claim 1, wherein a coupling portion of the attaching member is provided to the first folding portion, and an extension portion of the attaching member extends from the coupling portion and the first folding portion toward the second folding portion and the fourth folding portion.

4. The foldable stand according to claim 1, wherein in at least one of the folded states, the first folding portion is folded and stacked on the second folding portion and the fourth folding portion, the second folding portion and the fourth folding portion are folded relative to the third folding portion, and the fifth folding portion is folded and departed relative to the second folding portion and the fourth folding portion, so that the second folding portion, the fourth folding portion, and the fifth folding portion stand on the third folding portion, and the first folding portion is supported above the third folding portion by the second folding portion, the fourth folding portion, and the fifth folding portion.

5. The foldable stand according to claim 4, wherein a folding direction of the first folding portion is opposite to a folding direction of the second folding portion and the fourth folding portion.

6. The foldable stand according to claim 4, wherein the at least one sixth folding portion is stacked on the third folding portion.

7. The foldable stand according to claim 4, wherein the at least one sixth folding portion comprises two sixth folding portions adjacent between the fifth folding portion and the third folding portion, and in at least one of the folded states, the two sixth folding portions form a fold with each other and are located on an inner side of the third folding portion.

8. The foldable stand according to claim 4, wherein the at least one sixth folding portion comprises two sixth folding portions adjacent between the fifth folding portion and the third folding portion, and in at least one of the folded states, one of the two sixth folding portions adjacent to the third folding portion is stacked on the third folding portion, and other one of the two sixth folding portions adjacent to the fifth folding portion is located outside the third folding portion.

9. The foldable stand according to claim 4, wherein the portable electronic device has a first side edge and a second side edge opposite to each other, and the attaching member is aligned with the second side edge, so that the second side edge has a height difference with respect to the third folding portion in at least one of the folded states.

10. The foldable stand according to claim 9, wherein the portable electronic device moves away from the second folding portion and the fourth folding portion through the first folding portion and flips toward the fifth folding portion, so that the first side edge and the third folding portion share a same surface in another one of the folded states.

11. The foldable stand according to claim 10, wherein: the portable electronic device further has a third side edge and a fourth side edge opposite to each other, which are respectively adjacent to the first side edge and the second side edge; the third side edge is adjacent to a bend of the fourth folding portion and the third folding portion; the fourth side edge is adjacent to a bend of the second folding portion and the third folding portion; in another one of the folded states, the portable electronic device stands supported by the fourth side edge and the bend of the second folding portion and the third folding portion, or the portable electronic device stands supported by the fourth side edge and a bend of the fourth folding portion and the third folding portion.

12. The foldable stand according to claim 4, wherein the foldable plate has a first surface and a second surface opposite to each other, the attaching member is connected to the first surface, the second folding portion is folded toward the third folding portion and is opposite to the first surface, the fourth folding portion is folded toward the third folding portion and is opposite to the first surface, and the folding portion is stacked on the second surface.

13. The foldable stand according to claim 1, wherein
in at least one of the folded states, the first folding portion is folded and stacked on the fifth folding portion, the second folding portion and the fourth folding portion are folded relative to the third folding portion, the fifth folding portion is folded and departed relative to the second folding portion and the fourth folding portion, and the at least one sixth folding portion is stacked on the third folding portion; and
the portable electronic device has a first side edge and a second side edge opposite to each other, the attaching member is aligned with the second side edge, bends of the second folding portion and the fourth folding portion relative to the third folding portion are coplanar with the first side edge, and the second side edge is stacked on the fifth folding portion and is spaced apart from the at least one sixth folding portion.

14. The foldable stand according to claim 13, wherein the foldable plate has a first surface and a second surface opposite to each other, the attaching member is connected to the first surface, the second folding portion is folded toward the third folding portion and is opposite to the second surface, the fourth folding portion is folded toward the third folding portion and is opposite to the second surface, and the first folding portion is stacked on the second surface.

15. The foldable stand according to claim 1, further comprising a plurality of magnetic members respectively disposed in the folding portions.

16. The foldable stand according to claim 1, wherein the folding portions further comprises at least one seventh folding portion adjacent to the third folding portion and opposite to the second folding portion, the fourth folding portion, the fifth folding portion, and the at least one sixth folding portion.

17. The foldable stand according to claim 16, wherein in one of the folded states, the seventh folding portion bypasses the third folding portion, the at least one sixth folding portion, the second folding portion, the fifth folding portion, and the fourth folding portion and is stacked on the first folding portion, so that the foldable plate covers the portable electronic device.

18. The foldable stand according to claim 1, wherein the third folding portion is in a U-shape, and the U-shape comprises a first sub-folding portion and a second sub-folding portion foldable relative to each other, the first sub-folding portion is adjacent to the second folding portion, an other side of the first sub-folding portion and the second sub-folding portion are adjacent to the fourth folding portion.

19. The foldable stand according to claim 18, wherein: the fourth folding portion comprises a third sub-folding portion and a fourth sub-folding portion foldable in relation to each other; the third sub-folding portion is adjacent to the first folding portion, the fourth sub-folding portion, the first sub-folding portion, and the second sub-folding portion, and is opposite to the fifth folding portion with one of the pair of incisions interposed therebetween; the fourth sub-folding portion is adjacent to the first folding portion, the first sub-folding portion, the second sub-folding portion, and the third sub-folding portion; the fourth sub-folding portion and the second sub-folding portion are disposed symmetrically; the second sub-folding portion forms a bend relative to the first sub-folding portion, and the fourth sub-folding portion forms another bend relative to the third sub-folding portion, so that the portable electronic device is able to stand by a side edge, the bend, and the another bend.

* * * * *